United States Patent
Hsu et al.

(10) Patent No.: US 10,177,667 B2
(45) Date of Patent: Jan. 8, 2019

(54) ALTERNATING VALLEY SWITCHING FOR POWER CONVERTER

(71) Applicant: SEMICONDUCTOR COMPONENTS INDUSTRIES, LLC, Phoenix, AZ (US)

(72) Inventors: Chien-Tsun Hsu, Taipei (TW); Hang-Seok Choi, Yongin-si (KR); Chih-Hsien Hsieh, Dacun Township (TW)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/893,300

(22) Filed: Feb. 9, 2018

(65) Prior Publication Data
US 2018/0166993 A1    Jun. 14, 2018

Related U.S. Application Data

(63) Continuation of application No. 15/044,288, filed on Feb. 16, 2016, now Pat. No. 9,929,657.
(Continued)

(51) Int. Cl.
*H02M 3/335* (2006.01)
*H02M 1/08* (2006.01)
*H02M 1/00* (2006.01)

(52) U.S. Cl.
CPC ......... *H02M 3/33523* (2013.01); *H02M 1/08* (2013.01); *H02M 2001/0006* (2013.01);
(Continued)

(58) Field of Classification Search
CPC ............ Y02B 70/1425; Y02B 70/1433; Y02B 70/1491; H02M 2001/0035;
(Continued)

(56) References Cited

U.S. PATENT DOCUMENTS 7,684,216 B2    3/2010   Choi et al.
2009/0086513 A1  4/2009   Lombardo et al.
(Continued)

OTHER PUBLICATIONS

FSQ0765RS, "Green-Mode Fairchild Power Switch for Quasi-Resonant Operation—Low EMI and High Efficiency," Fairchild Semiconductor Industries, Mar. 2010, Rev. 1 02.*
(Continued)

*Primary Examiner* — Kyle J Moody
*Assistant Examiner* — Jye-June Lee
(74) *Attorney, Agent, or Firm* — Robert F. Hightower

(57) ABSTRACT

An exemplary embodiment of an alternating valley switching controller is provided. The alternating valley switching controller includes a valley detection circuit and an alternating circuit. The valley detection circuit is coupled to an auxiliary winding of a transformer to generate a valley-detection signal. The alternating circuit alternates a plurality of switching periods of a switching signal according to a blanking-window signal and the valley-detection signal. The blanking-window signal switches between a first voltage level and a second voltage level in the plurality of switching periods. The plurality of switching periods includes at least two first periods and at least two second periods which occur alternately in response to the first voltage level and the second voltage of the blanking-window signal.

20 Claims, 5 Drawing Sheets

Related U.S. Application Data

(60) Provisional application No. 62/117,066, filed on Feb. 17, 2015.

(52) U.S. Cl.
CPC ............... *H02M 2001/0009* (2013.01); *H02M 2001/0058* (2013.01); *H02M 2001/0064* (2013.01); *Y02B 70/1433* (2013.01)

(58) Field of Classification Search
CPC ........... H02M 2001/0058; H02M 1/44; H02M 3/33507; H02M 3/33523; H02M 2001/0006; H02M 2001/0009; H02M 2001/0064; H02M 1/08
See application file for complete search history.

(56) References Cited

U.S. PATENT DOCUMENTS

| | | |
|---|---|---|
| 2010/0315838 A1 | 12/2010 | Mao et al. |
| 2011/0182088 A1 | 7/2011 | Lidak et al. |
| 2013/0121049 A1 | 5/2013 | Shi et al. |
| 2014/0002931 A1 | 1/2014 | Adragna |
| 2014/0029316 A1* | 1/2014 | Adragna ........... H02M 3/33523 363/21.18 |
| 2016/0020699 A1 | 1/2016 | Shen et al. |
| 2017/0054374 A1 | 2/2017 | Fang et al. |

OTHER PUBLICATIONS

FSQ0565RS/RQ, "Green-Mode Power Switch for Quasi-Resonant Operation—Low EMI and High Efficiency," Semiconductor Components Industries, LLC, Oct. 2017, Rev. 3, 23 pages.

\* cited by examiner

ALTERNATING VALLEY SWITCHING FOR POWER CONVERTER

CROSS REFERENCE TO RELATED APPLICATIONS

This Application claims the benefit of U.S. Provisional Application No. 62/117,066, filed Feb. 17, 2015, the contents of which are incorporated herein by reference and priority thereto is hereby claimed. The present application is also a continuation application of prior U.S. application Ser. No. 15/044,288, filed on Feb. 16, 2016, which is hereby incorporated herein by reference, and priority thereto is hereby claimed.

BACKGROUND OF THE INVENTION

Field of the Invention

The invention relates to a power converter, and, more particularly, to a power converter with alternating valley switching.

Description of the Related Art

Power converters are used to convert an unregulated power source into a regulated voltage or current source. A power converter normally includes a transformer having a primary winding and a secondary winding to provide the isolation. The switching device connected to the primary winding controls the energy transfer from the primary winding to the secondary winding. A power converter operated at a high frequency allows for size and weight reduction. However, the switching behavior of the switching device generates switching losses and electric-magnetic-interference (EMI). Thus, valley switching is provided for power converters to reduce switching losses and electric-magnetic-interference. In the prior art, a valley is locked to switch the switching device of a power converter. However, when a valley is locked, the power converter has to operate at a lower operation frequency to keep the output power. Thus, power converters with a valley locking operation may not operate at high frequencies.

BRIEF SUMMARY OF THE INVENTION

An exemplary embodiment of an alternating valley switching controller is provided. The alternating valley switching controller comprises a valley detection circuit and an alternating circuit. The valley detection circuit is coupled to an auxiliary winding of a transformer to generate a valley-detection signal. The alternating circuit alternates a plurality of switching periods of a switching signal according to a blanking-window signal and the valley-detection signal. The blanking-window signal switches between a first voltage level and a second voltage level in the plurality of switching periods. The plurality of switching periods comprises at least two first periods and at least two second periods which occur alternately in response to the first voltage level and the second voltage of the blanking-window signal.

Another exemplary embodiment of an alternating valley switching controller is provided. The alternating valley switching controller comprises an alternating circuit. The alternating circuit alternates a plurality of switching periods of a switching signal according to a valley-detection signal. The valley-detection signal is generated by an auxiliary winding of a transformer. The alternating circuit alternately operates between a first voltage level and a second voltage level in the plurality of switching periods. The plurality of switching periods comprises at least two first periods and at least two second periods which occur alternately in response to the first voltage level and the second voltage.

An exemplary embodiment of a control method for alternating valley switching of a power converter is provided. The control method comprises the steps of alternating a plurality of switching periods of a switching signal and switching a power switch of the power converter according to the switching signal. The plurality of switching periods comprises at least two first periods and at least two second periods which occur alternately. Voltage levels of peaks of a current signal which is generated according to a switching current flowing through the power switch are identical.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
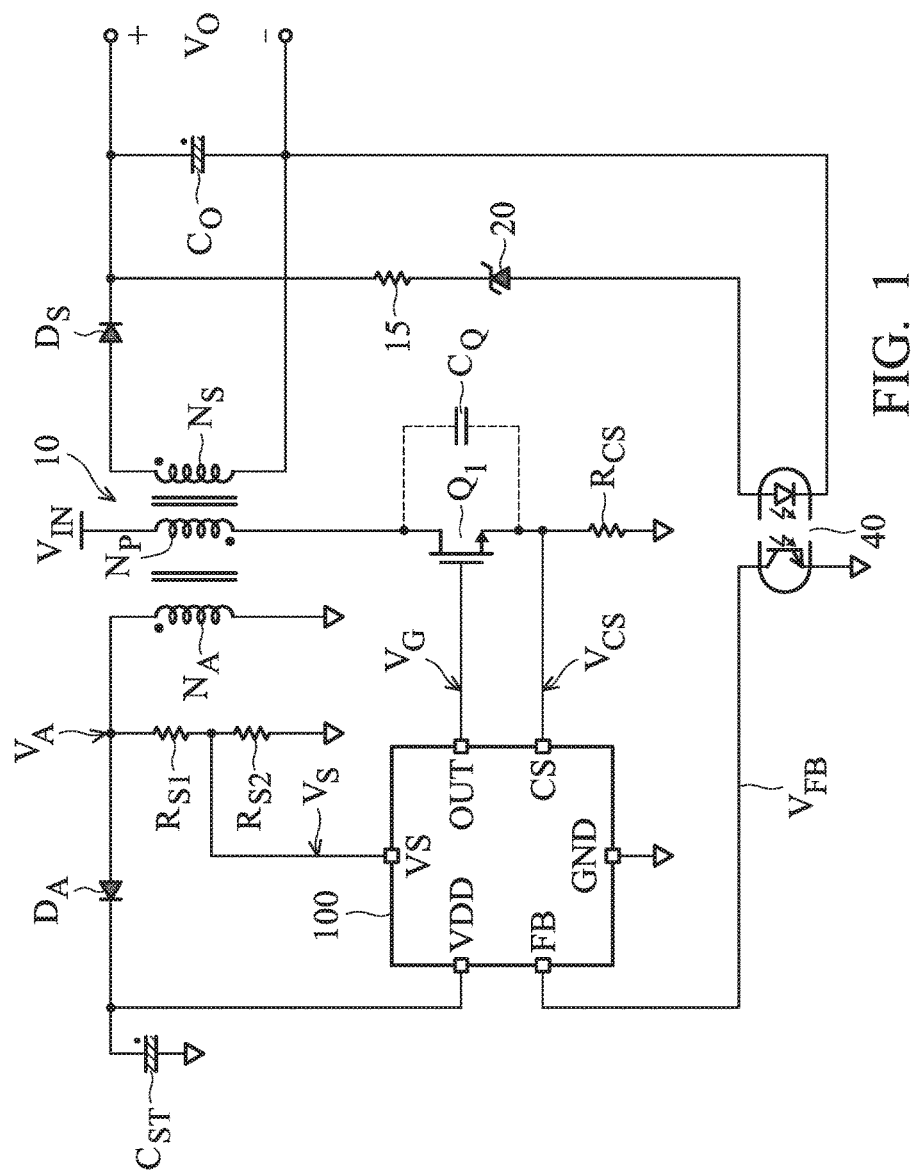
FIG. 1 shows an exemplary embodiment of a power converter.

FIG. 1 shows an exemplary embodiment of a power converter. The power converter in the embodiment of FIG. 1 is a flyback power converter. Referring to FIG. 1, a transformer (magnetic device) 10 is coupled to an input voltage $V_{IN}$ of the power converter. The transformer 10 comprises a primary winding $N_P$, a secondary winding $N_S$ and an auxiliary winding $N_A$. A switching controller 100 includes a feedback terminal FB, a current-sense terminal CS, an input terminal VS, a power terminal VDD, and an output terminal OUT. A power switch $Q_1$ is coupled with the primary winding $N_P$. The switching controller 100 generates a switching signal $V_G$ through the output terminal OUT to control (turn on or off) the power switch $Q_1$. The power switch $Q_1$ is controlled by the switching signal $V_G$ to switch the transformer 10 for generating and regulating an output voltage $V_O$ of the power converter. Due to the switching of the transformer 10, a switching current through the power switch $Q_1$ and a current-sense resistor $R_{CS}$ is induced. A current signal $V_{CS}$ is generated in response to the switching current and the current-sense resistor $R_{CS}$ and received by the switching controller 100 through the current-sense terminal CS. The secondary winding $N_S$ of the transformer 10 is coupled to the output of the power converter through a rectifier $D_S$ and an output capacitor $C_O$. An optical coupler 40 is coupled to the output voltage $V_O$ of the power converter through a resistor 15 and a voltage regulator 20. The optical coupler 40 is equipped to generate a feedback signal $V_{FB}$ according to the output voltage $V_O$. The feedback terminal FB of the switching controller 100 receives the feedback signal $V_{FB}$. The auxiliary winding $N_A$ provides power source for the switching controller 100 through another rectifier $D_A$ and a capacitor $C_{ST}$. Resistors $R_{S1}$ and $R_{S2}$ are coupled in series between the auxiliary winding $N_A$ and the ground to form a voltage divider. Through the operation of the voltage divider, a voltage-detection signal $V_S$ is generated at the joint point between the resistors $R_{S1}$ and $R_{S2}$ according to the voltage $V_A$ on the auxiliary winding $N_A$. The switching controller 100 receives the voltage-detection signal $V_S$ through the input terminal VS.

Figure 2:
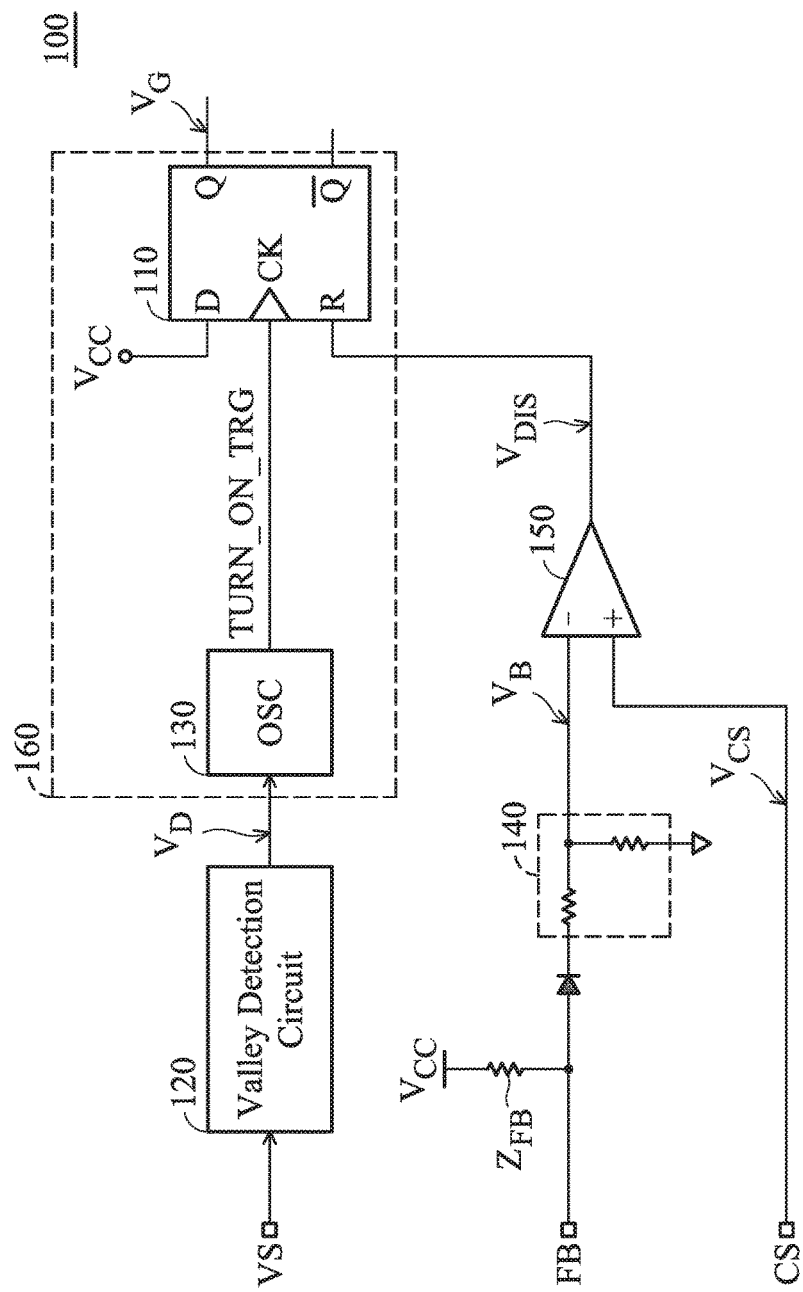
FIG. 2 shows an exemplary embodiment of a switching controller of a power converter of FIG. 1.
Figure 5:
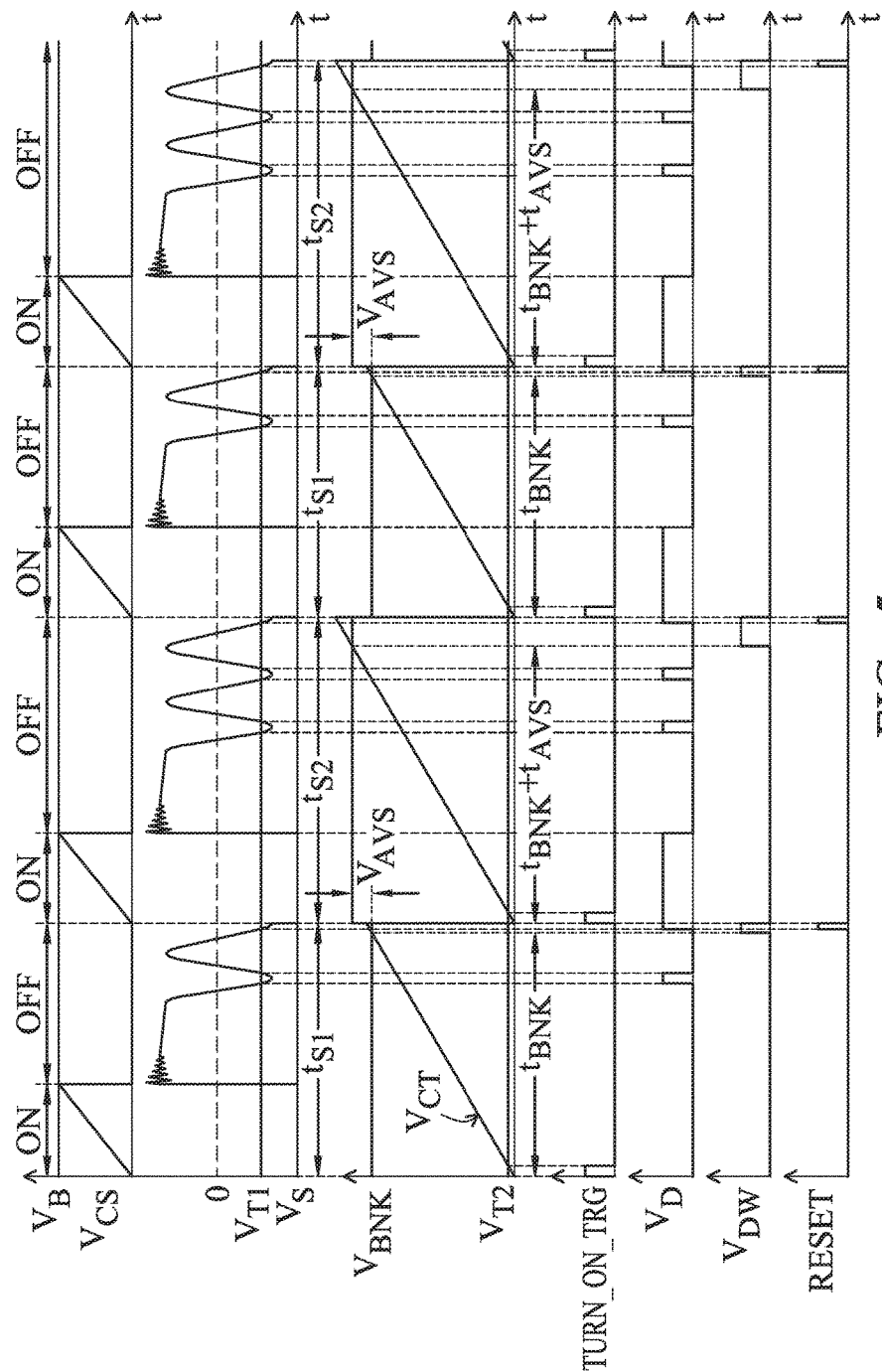
FIG. 5 shows key signals of the power converter of FIG. 1.

FIG. 2 shows an exemplary embodiment of the switching controller 100. As shown in FIG. 2, the switching controller 100 comprises a valley detection circuit 120, an alternating circuit 160 including a D flip-flop 110 and an oscillator (OSC) 130, a voltage divider 140, and a comparator 150. The valley detection circuit 120 and the oscillator 130 operate to generate an enable signal TURN_ON_TRG for controlling the timing of turning on the switching signal $V_G$. The voltage divider 140 and the comparator 150 operate to generate a disable signal $V_{DIS}$ for controlling the timing of turning off the switching signal $V_G$. The D flip-flop 110 has an input terminal D receiving an operation voltage $V_{CC}$, a clock terminal CK receiving the enable signal TURN_ON_TRG, a reset terminal R receiving the disable signal $V_{DIS}$, and an output terminal Q generating the switching signal $V_G$. As described above, the current signal $V_{CS}$ is generated in response to the switching current flowing through the power switch $Q_1$. Thus, the current signal $V_{CS}$ is capable of representing the state of the switching signal $V_G$. As shown in FIG. 5, the switching controller 100 generates the switching signal $V_G$ in switching periods. In the embodiment, four switching periods including two periods $t_{S1}$ and two periods $t_{S2}$ which occurs alternately are given as an example of the switching periods. In each switching period, the voltage level of the current signal $V_{CS}$ rises gradually from an initial level while the switching signal $V_G$ is in an on-state (ON); the voltage level of the current signal $V_{CS}$ is reset to the initial level while the switching signal $V_G$ is in an off-state (OFF). Referring to FIG. 5, for each switching period, when the switching signal $V_G$ is in the off-state, resonance is induced on the voltage-detection signal $V_S$ due to the parasitical capacitance $C_Q$ of the power switch $Q_1$ and the leakage inductance of the primary winding $N_P$ of the transformer 10.

Figure 3:
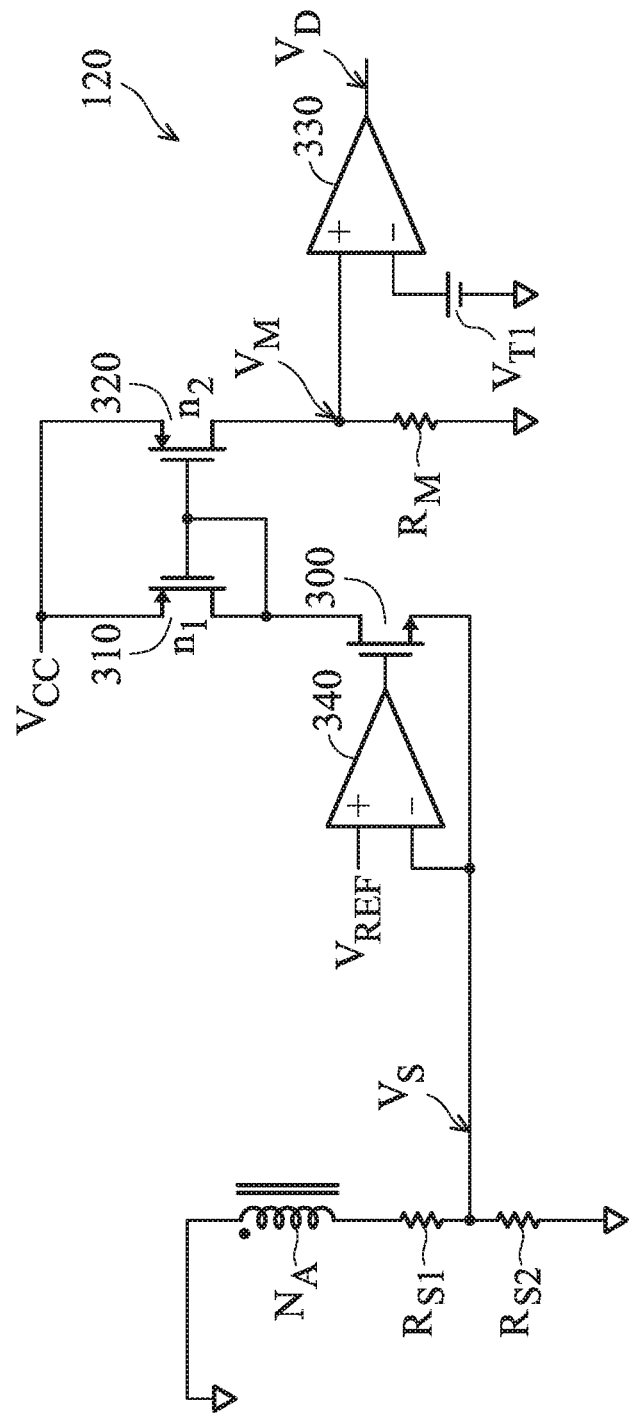
FIG. 3 shows an exemplary embodiment of a valley detection circuit in the switching controller of FIG. 2.

The valley detection circuit 120 is configured to detect valleys induced by the resonance during the off-state of the switching signal $V_G$. Referring to FIG. 3, the valley detection circuit 120 comprises transistors 300, 310, and 320, a comparator 330, an operational amplifier 340, and a resistor $R_M$. The transistors 310 and 320 form a current mirror circuit.

The negative input terminal of the operation amplifier 340 is coupled to the input terminal VS to receive the voltage-detection signal $V_S$. The positive input terminal of the operation amplifier 340 receives a reference voltage $V_{REF}$. The output of the operational amplifier 340 controls the gate of the transistor 300. The source of the transistor 300 is coupled to the input terminal VS. Therefore, the minimum voltage of the input terminal VS is regulated as the reference voltage $V_{REF}$. The current mirror circuit formed by the transistors 310 and 320 is coupled to the drain of the transistor 300 to generate a voltage signal $V_M$ at the resistor $R_M$ in response to a current flowing through the resistor $R_M$. The comparator 330 compares the voltage signal $V_M$ with a threshold $V_{T1}$ and generates a valley-detection signal $V_D$ according to the comparison result. The case where the voltage signal $V_M$ exceeds the threshold $V_{T1}$ means that one valley occurs on the voltage-detection signal $V_S$. At this time, the valley-detection signal $V_D$ has one pulse (that is the valley-detection signal $V_D$ is at a high voltage level). To illustrate valley detection, FIG. 5 shows the relationship between the voltage-detection signal $V_S$ and the threshold $V_{T1}$. Through the operations of the valley detection circuit 120, when the voltage-detection signal $V_S$ is lower than the threshold $V_{T1}$, one valley of the voltage-detection signal $V_S$ is detected and the one pulse of the valley-detection signal $V_D$ occurs.

Figure 4:
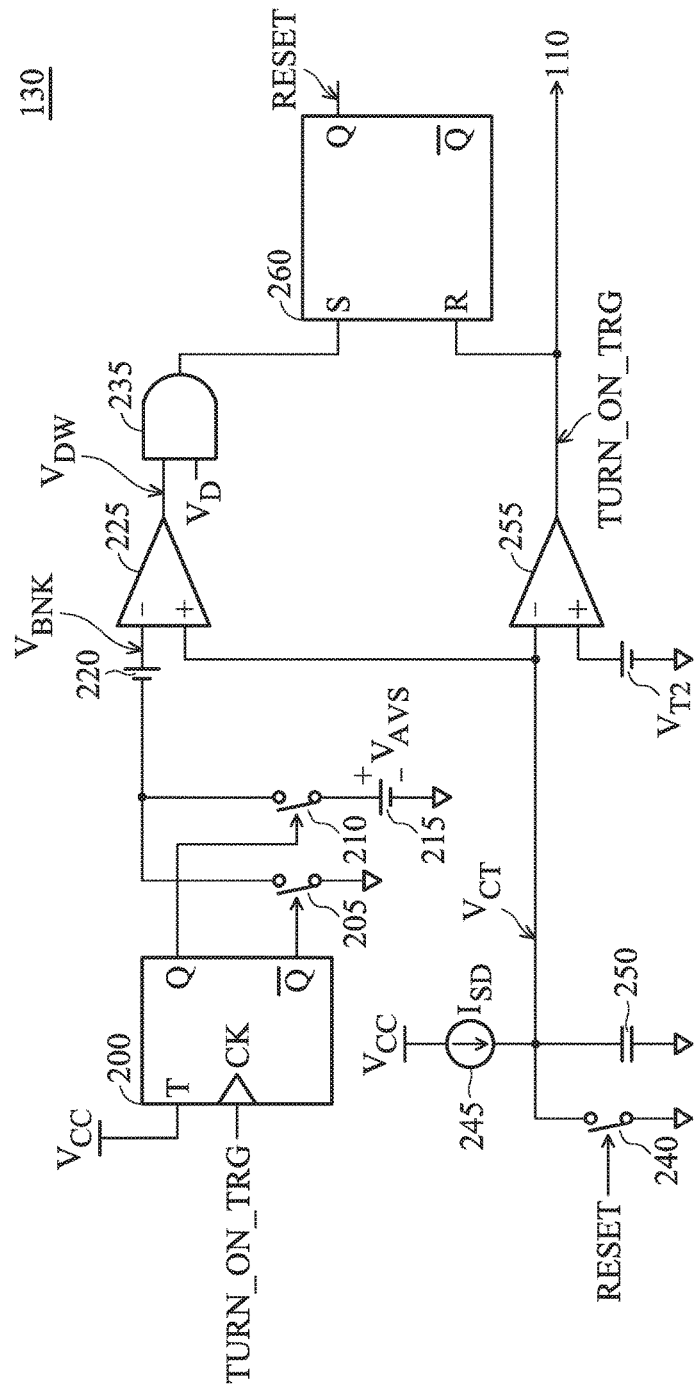
FIG. 4 shows an exemplary embodiment of an oscillator in the switching controller of FIG. 2.

FIG. 4 shows an exemplary embodiment of the oscillator 30 of the alternating circuit 160. As shown in FIG. 4, the oscillator 30 comprises a T flip-flop 200, switches 205 and 210, voltage sources 215 and 220, a comparator 225, an AND gate 235, a switch 240, a current source 245, a capacitor 250, a comparator 255, and an SR flip-flop 260. The switch 240, the current source 245, and the capacitor 250 form a charging circuit. The switch 240 is controlled by a reset signal RESET. When the switch 240 is turned off according to the reset signal RESET, the current $I_{SD}$ provided by the current source 245 charges the capacitor 250. At this time, a sawtooth signal $V_{CT}$ at the capacitor 250 rises gradually. The comparator 255 compares the sawtooth signal $V_{CT}$ with a threshold $V_{T2}$ to generate the enable signal TURN_ON_TRG. During the period when the sawtooth signal $V_{CT}$ is lower than the threshold $V_{T2}$, the enable signal TURN_ON_TRG has a pulse transmitted to the clock terminal CK of the D flip-flop 110 (shown in FIG. 2). Thus, the D flip-flop 110 turns on the switching signal $V_G$. At this time, the power switch $Q_1$ is turned on by the switching signal $V_G$ with the on-state, and the voltage level of the current signal $V_{CS}$ rises gradually from the initial level. According to the above operation, the enable signal TURN_ON_TRG is generated for controlling the timing of turning on the switching signal $V_G$. In other words, the occurrence of one pulse of the enable signal TURN_ON_TRG represents the switching signal $V_G$ entering the on-state.

During the on-state of the switching signal $V_G$, the level of the current signal $V_{CS}$ rises gradually until the current signal $V_{CS}$ reaches a feedback voltage $V_B$. Referring to FIG. 2, the optical coupler 40 generates the feedback signal $V_{FB}$ according to the output voltage $V_O$ of the power converter. The feedback signal $V_{FB}$ generated by the optical coupler 40 is divided by the voltage divider 140 to generate the feedback voltage $V_B$. Thus, the feedback voltage $V_B$ is related to the output voltage $V_O$ of the power converter. The negative input terminal of the comparator 150 receives the feedback voltage $V_B$. The positive input terminal of the comparator 150 receives the current signal $V_{CS}$. The comparator 150 compares the current signal $V_{CS}$ with the feedback voltage $V_B$ and generates the disable signal $V_{DIS}$ according to the comparison result. When the current signal $V_{CS}$ reaches the feedback voltage $V_B$, the disable signal $V_{DIS}$ is coupled to reset the D flip-flop 110. At this time, the switching signal $V_G$ enters the off-state (the switching signal $V_G$ is turned off), and the power switch $Q_1$ is turned off. Due to the turned-off power switch $Q_1$, the current signal $V_{CS}$ falls to the initial level. As shown in FIG. 5, during to the off-state of the switching signal $V_G$, resonance is induced on the voltage-detection signal $V_S$ due to the parasitical capacitance $C_Q$ of the power switch $Q_1$ and the leakage inductance of the primary winding $N_P$ of the transformer 10.

Referring to FIG. 4 again, the T flip-flop 200 has an input terminal T receiving the operation voltage $V_{CC}$, a clock terminal CK receiving the enable signal TURN_ON_TRG, an output terminal Q, and an inverse output terminal $\overline{Q}$. The negative input terminal of the comparator 225 is coupled to the voltage source 220, and the positive input terminal thereof receives the sawtooth signal $V_{CT}$. One input terminal of the AND gate 235 is coupled to the output terminal of the comparator 225, and the other input terminal thereof receives the valley-detection signal $V_D$. The SR flip-flop 260 has an input terminal S coupled to the output terminal of the AND gate 235, an input terminal R receiving the enable signal TURN_ON_TRG, and an output terminal Q generating the reset signal RESET. The switches 205 and 210 are coupled to the negative input terminal of the comparator 225 through the voltage source 220. The voltage source 215 which provides a difference voltage $V_{AVS}$ is coupled between the switch 210 and the ground.

The switches 205 and 210 are controlled by the signals at the output terminals Q and $\overline{Q}$ of the T flip-flop 200, respectively. Referring to FIG. 5, for example, in one switching period $t_{S1}$, the T flip-flop 200 is triggered by one pulse of the enable signal TURN_ON_TRG to generate a signal at the output terminal Q to turn off the switch 210 and a signal at the output terminal $\overline{Q}$ to turn on the switch 205. At this time, a blanking-window signal $V_{BNK}$ with a lower voltage level is generated at the negative input terminal of the comparator 225. The lower voltage level is provided by the voltage source 220. In one switching period $t_{S2}$, the T flip-flop 200 is triggered by another pulse of the enable signal TURN_ON_TRG to generate a signal at the output terminal Q to turn on the switch 210 and a signal at the output terminal $\overline{Q}$ to turn off the switch 205. At this time, the blanking-window signal $V_{BNK}$ switches to a higher voltage level from the lower voltage level. The difference voltage $V_{AVS}$ representing a difference between the higher voltage level and the lower voltage level is provided by the voltage source 215. As shown in FIG. 5, the blanking-window signal $V_{BNK}$ switches between the two different voltage levels in the switching periods of the switching signal $V_G$. Thus, the alternating circuit 160 alternately operates between the two difference voltage levels in the switching periods of the switching signal $V_G$.

The comparator 225 compares the sawtooth signal $V_{CT}$ with the blanking-window signal $V_{BNK}$ and generates a detection-window signal $V_{DW}$. When the sawtooth signal $V_{CT}$ is greater than the blanking-window signal $V_{BNK}$, the detection-window signal $V_{DW}$ is enabled to have a high voltage level. During the period when the detection-window signal $V_{DW}$ is at the high voltage level, once one pulse of the valley-detection signal $V_D$ occurs due to occurrence of one valley of the voltage-detection signal $V_S$, the AND gate 235 outputs a high voltage level signal to the input terminal S of the SR flip-flop 260. At this time, the enable signal TURN_ON_TRG is at a low voltage level due to the sawtooth signal $V_{CT}$ being higher than the threshold $V_{T2}$, that is, there is no pulse on the enable signal TURN_ON_TRG. Accordingly, the SR flip-flop 260 generates the reset signal RESET with one pulse to turn on the switch 240. Due to the turned-on-state of the switch 240, the sawtooth signal $V_{CT}$ is reset. After the sawtooth signal $V_{CT}$ is reset, the switching controller 100 switches to operate in the following switching period. In this following switching period, the sawtooth signal $V_{CT}$ rises gradually again. Similar to the above description, during the period when the sawtooth signal $V_{CT}$ is lower than the threshold $V_{T2}$, the enable signal TURN_ON_TRG has one pulse, and the D flip-flop 110 turns on the switching signal $V_G$ according to the enable signal TURN_ON_TRG with the one pulse. Simultaneously, the T flip-flop 200 is triggered by the one pulse of the enable signal TURN_ON_TRG for changing the states of the switches 205 and 210. Thus, the blanking-window signal $V_{BNK}$ switches to the other voltage level. According to the above description, the switching controller 100 turns on the switching signal $V_G$ at the valley of the voltage-detection signal $V_S$ which occurs first after the sawtooth signal $V_{CT}$ reaches the voltage level of the blanking-window signal $V_{BNK}$, as shown in FIG. 5.

Referring to FIG. 5, among the switching periods of the switching signal $V_G$, the periods $t_{S1}$ and the periods $t_{S2}$ occurs alternately. In detail, the alternating circuit 160 alternates the switching periods of the switching signal $V_G$ according to the blanking-window signal $V_{BNK}$ and the valley-detection signal $V_D$. The blanking-window signal $V_{BNK}$ is at a lower voltage level in each period $t_{S1}$, while the blanking-window signal $V_{BNK}$ is at a higher voltage level in each period $t_{S2}$. Thus, the blanking window period ($t_{BNK}$) when the sawtooth signal $V_{CT}$ is lower than the blanking-window signal $V_{BNK}$ in each period $t_{S1}$ is shorter than the blanking-window period ($t_{BNK}+t_{AVS}$) when the sawtooth signal $V_{CT}$ is lower than the blanking-window signal $V_{BNK}$ in each period $t_{S2}$. The alternating-valley time $t_{AVS}$ representing a difference between the blanking-window period in one period $t_{S1}$ and the blanking window period in one period $t_{S2}$ is induced by the voltage difference $V_{AVS}$. Thus, for each period $t_{S1}$, the switching signal $V_G$ will switch to the on-state of the following period $t_{S2}$ at the second valley of the voltage-detection signal $V_S$, while for each period $t_{S2}$, the switching signal $V_G$ will switch to the on-state of the following period $t_{S1}$ at the third valley of the voltage-detection signal $V_S$.

In another aspect, since the voltage level of the blanking-window signal $V_{BNK}$ switches between two different voltage levels, the off-time of the switching signal $V_G$ switches between two different time lengths. In more detail, the off-time of the switching signal $V_G$ switches has a shorter time length due to the blanking-window signal $V_{BNK}$ with a lower voltage level, while the off time of the switching signal $V_G$ switches has a longer time length due to the blanking-window signal $V_{BNK}$ with a higher voltage level. Moreover, due to the feedback voltage $V_B$, the peaks of the current signal $V_{CS}$ are limited. That is, the voltage levels of the peaks of the current signal $V_{CS}$ are identical. Accordingly, the on-time of the switching signal $V_G$ in the switching periods is fixed. In the above description, the length of each switching period for the switching signal $V_G$ is dominated by the corresponding off-time of the switching signal $V_G$. The periods $t_{S1}$ and the period $t_{S2}$ occur alternately in response to the lower voltage level and the higher voltage level of the blanking-window signal $V_{BNK}$.

According to the above embodiment, for reducing switching losses and electric-magnetic-interference, the switching of the power switch $Q_1$ is achieved in a regular manner. In more detail, the power switch $Q_1$ is turned on alternately at two specific valleys in the successive switching periods. Thus, the operation frequency of the power converter may not be limited.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A switching controller for a power supply comprising:
an alternating circuit configured to form a switching signal to switch a transformer to regulate an output voltage of the power supply, the switching signal having a plurality of switching periods wherein each period has an on-time and an-off time;
a detection circuit configured to receive a valley signal that is representative of oscillations of the transformer during one or more off-times of the switching signal, the oscillations of each off-time having peaks and valleys, the detection circuit configured to generate a valley-detection signal in response to detecting one or more valleys of the oscillations;
the alternating circuit configured to form a first switching period and to detect a first number of valleys of the oscillations during the first switching period, the alternating circuit configured to terminate the first switching period and initiate an immediate subsequent second switching period in response to detecting the first number of valleys, the alternating circuit configured to terminate the second switching period and to initiate an immediately preceding third switching period in response to detecting a second number of valleys during the second switching period wherein the second number is either one number less or one number more than the first number; and
the alternating circuit configured to sequentially repeat a sequence of terminating one switching period in response to detecting the first number of valleys and to terminate another switching period, that is immediately subsequent to the one switching period, in response to detecting the second number of valleys.

2. The switching controller of claim 1 wherein the alternating circuit is configured to terminate the third switching period upon detecting the first number of valleys.

3. The switching controller of claim 1 wherein the alternating circuit includes a blanking circuit configured to form a blanking-window signal that switches between a first voltage level for the first switching period and a second voltage level for the second switching period.

4. The switching controller of claim 3 wherein the first voltage level is used to detect the first number of valleys and the second voltage level is used to detect the second number of valleys.

5. The switching controller of claim 4 wherein the blanking-window signal sequentially alternates between the first voltage level and the second voltage level for each alternate switching period.

6. The switching controller of claim 4 wherein the off-time of the switching signal in the plurality of switching periods alternates between a first time length and a second time length in response to the first voltage level and the second voltage level of the blanking-window signal.

7. The switching controller of claim 1 wherein the on-time of the switching signal in the plurality of switching periods is fixed.

8. The switching controller of claim 1 further including an oscillator circuit configured to form the plurality of switching signals to alternately have a first time interval and a second time interval that is greater than the first time interval.

9. The switching controller of claim 1 further including a blanking circuit having a ramp circuit, the blanking circuit configured to form a blanking-window signal;
the ramp circuit configured to form a ramp signal and to terminate a ramp period of the ramp signal in response to the ramp signal having a value substantially equal to the blanking-window signal; and
the blanking circuit configured to change the blanking-window signal to a different one of a first or a second voltage level in response to the termination of the ramp period.

10. A switching controller comprising:
an alternating circuit configured to form a switching signal having alternate switching periods according to a valley-detection signal wherein a plurality of switching periods include at least a first period that is terminated in response to detecting a first number valleys of the valley-detection signal followed immediately by a second period that is terminated in response to detecting a second number of valleys of the valley-detection signal and followed immediately by third period that is terminated in response to detecting the first number of valleys wherein the second number is one greater than the first number.

11. The switching controller of claim 10 wherein the alternating circuit forms the valley-detection signal in response to a valley signal from an auxiliary winding of a transformer, the alternating circuit alternately operates between a first voltage level and a second voltage level in the plurality of switching periods.

12. The switching controller of claim 10 wherein voltage levels of peaks of a current signal, that is representative of current flowing through a power switch, are identical wherein the current is generated according to the switching signal.

13. The switching controller of claim 10 wherein the switching controller is configured to continually repeat the sequence of alternately terminating switching periods in response to detecting the first number then the second number of valleys.

14. A method for forming a control circuit for a power converter comprising:
configuring the control circuit to form a switching signal to control a current through a transformer and regulate an output voltage; and
configuring the control circuit to detect oscillations of a transformer signal during one or more periods of the switching signal and to form a sequence of two immediately subsequent switching periods wherein a first switching period is terminated in response to detecting a first number of valleys of the oscillation during the first switching period, and to terminate an immediately subsequent second switching period in response to a second number of valleys that is either one less than or one greater than the first number wherein another first switching period that is terminated in response to detecting the first number of valleys immediately follows the second switching period.

15. The method of claim 14 including configuring the control circuit to continually repeat forming the first switching period followed immediately by the second switching period.

16. The method of claim 14 including configuring the control circuit to detect valleys during a time when the switching signal is in an off-state.

17. The method of claim 14 including forming the switching controller to form an on-time of the switching signal with a fixed time interval for the one or more periods of the switching signal.

18. A method for forming a control circuit for a power converter comprising:
 configuring the control circuit to form a switching signal to control a current through a transformer and regulate an output voltage;
 configuring the control circuit to detect oscillations of a transformer signal during one or more switching periods of the switching signal and to form a sequence of two immediately subsequent switching periods wherein one switching period of the two immediately subsequent switching periods is terminated in response to detecting a first number of valleys of the oscillation during the one switching period and to terminate an immediately subsequent switching period of the two immediately subsequent switching periods in response to a second number of valleys that is either one less than or one greater than the first number; and
 configuring a blanking circuit to form a blanking-window signal which switches between a first voltage level for a first switching period of the switching signal and a second voltage level for a second switching period of the switching signal.

19. The method of claim 18 including configuring the blanking circuit to form a saw-tooth signal;
 configuring the blanking circuit to compare the saw-tooth signal with the blanking-window signal; and
 configuring the blanking circuit to turn on the switching signal at a valley which occurs first after the saw-tooth signal reaches the first or second voltage level of the blanking-window signal.

20. The method of claim 19 wherein terminating the saw-tooth signal terminates the switching period of the switching signal and toggles the blanking-window between the first and second voltage values.

* * * * *